United States Patent
Neustrom et al.

(10) Patent No.: US 11,520,655 B1
(45) Date of Patent: *Dec. 6, 2022

(54) SYSTEMS AND METHODS FOR SELF CORRECTING SECURE COMPUTER SYSTEMS

(71) Applicant: KEEP SECURITY, LLC, Kansas City, MO (US)

(72) Inventors: Joshua Neustrom, Kansas City, MO (US); Edward Neustrom, Kansas City, MO (US)

(73) Assignee: KEEP SECURITY, LLC, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/547,460

(22) Filed: Dec. 10, 2021

Related U.S. Application Data

(63) Continuation of application No. 17/018,935, filed on Sep. 11, 2020, now Pat. No. 11,263,074, which is a continuation-in-part of application No. 16/743,907, filed on Jan. 15, 2020, now Pat. No. 11,048,578, which is a continuation of application No.
(Continued)

(51) Int. Cl.
*G06F 11/00* (2006.01)
*G06F 11/07* (2006.01)
*G06F 9/4401* (2018.01)

(52) U.S. Cl.
CPC ........ *G06F 11/0793* (2013.01); *G06F 9/4416* (2013.01); *G06F 11/0721* (2013.01); *G06F 2213/0042* (2013.01)

(58) Field of Classification Search
CPC ............. G06F 11/0793; G06F 11/0721; G06F 11/0709; G06F 11/0736
See application file for complete search history.

(56) References Cited

U.S. PATENT DOCUMENTS

| 6,072,830 A | 6/2000 | Proctor et al. |
| 6,763,456 B1 | 7/2004 | Agnihotri et al. |

(Continued)

FOREIGN PATENT DOCUMENTS

| EP | 1244951 A2 | 10/2002 |
| WO | 02054234 A1 | 7/2002 |
| WO | 2007092750 A2 | 8/2007 |

OTHER PUBLICATIONS

Boot Linux Mint, Dec. 12, 2017, https://linuxnnint-installation-guide.readthedocs.io/en/latest/boot.html, 2 pages (Year: 2017).
(Continued)

*Primary Examiner* — Katherine Lin
(74) *Attorney, Agent, or Firm* — Armstrong Teasdale LLP

(57) ABSTRACT

A self-correcting secure computer system is provided. The computer system includes a read-only memory (ROM) device, a random access memory (RAM) device, and at least one processor in communication with the ROM device and the RAM device. The at least one processor is programmed to receive an activation signal; retrieve, from the ROM device, data to execute a first configuration including an encryption suite; execute, on the RAM device, the first configuration including the encryption suite; execute the encryption suite to generate a key; store the key at a first memory location; and delete volatile memory associated with the encryption suite.

20 Claims, 7 Drawing Sheets

Related U.S. Application Data

15/939,496, filed on Mar. 29, 2018, now Pat. No. 10,579,465.

(56) References Cited

U.S. PATENT DOCUMENTS

| | | | |
|---|---|---|---|
| 6,934,881 | B2 | 8/2005 | Gold et al. |
| 7,111,201 | B2 | 9/2006 | Largman et al. |
| 7,137,034 | B2 | 11/2006 | Largman et al. |
| 7,395,394 | B2 | 7/2008 | Federa et al. |
| 7,467,326 | B2 | 12/2008 | Hillman et al. |
| 7,835,301 | B1 | 11/2010 | Maufer |
| 7,886,048 | B1 | 2/2011 | Holland |
| 8,468,334 | B1 | 6/2013 | Jonna et al. |
| 8,516,186 | B2 | 8/2013 | Fukui et al. |
| 8,543,764 | B2 | 9/2013 | Jevans et al. |
| 8,566,574 | B2 | 10/2013 | Shriver |
| 8,583,770 | B2 | 11/2013 | Van Riel |
| 9,268,667 | B2 | 2/2016 | Chen et al. |
| 9,507,584 | B2 | 11/2016 | Tsuji et al. |
| 9,578,763 | B1 | 2/2017 | Wade |
| 9,804,869 | B1 | 10/2017 | Wang et al. |
| 9,824,220 | B2 | 11/2017 | Baentsch et al. |
| 10,019,252 | B1 | 7/2018 | Cui et al. |
| 2007/0234032 | A1 | 10/2007 | Chen et al. |
| 2007/0288938 | A1 | 12/2007 | Zilavy et al. |
| 2009/0089865 | A1 | 4/2009 | Baron et al. |
| 2009/0262927 | A1 | 10/2009 | Hinaga |
| 2012/0239918 | A1 | 9/2012 | Huang |
| 2013/0031346 | A1 | 1/2013 | Sakarda |
| 2014/0122903 | A1* | 5/2014 | Endo .................. H04L 9/14 713/193 |
| 2015/0264217 | A1 | 9/2015 | Goda |
| 2016/0098360 | A1 | 4/2016 | Gillespie et al. |
| 2017/0064599 | A1 | 3/2017 | Caine et al. |
| 2017/0230179 | A1 | 8/2017 | Mannan et al. |
| 2017/0286127 | A1 | 10/2017 | Artman et al. |
| 2017/0337070 | A1 | 11/2017 | Lee |
| 2018/0288618 | A1 | 10/2018 | Kumar et al. |
| 2019/0020676 | A1 | 1/2019 | Laughlin et al. |
| 2020/0104525 | A1* | 4/2020 | Jäger .................. G06F 21/602 |

OTHER PUBLICATIONS

Kurve, How to Change Your Mac's MAC Address (and Why), Aug. 30, 2017, makeuseof.com, 20 pages (Year: 2017).

Troubleshooting common Knox issues, Mar. 10, 2018, https://docs.sannsungknox.conn/knox-workspace-adnnin-guide-3-0/Content/troublehoot-Knox-workspace-issues.htm, 12 pages (Year: 2018).

Brinkmann, Windows 10 Creators Update, Jul. 5, 2017, gHacks Tech News, 4 pages (Year: 2017).

Techopedia, What is Boot Sequence, Nov. 15, 2016, https://www.techopedia.com/, 10 pages (Year: 2016).

\* cited by examiner

SYSTEMS AND METHODS FOR SELF CORRECTING SECURE COMPUTER SYSTEMS

CROSS REFERENCE TO RELATED APPLICATIONS

This application is a continuation of U.S. patent application Ser. No. 17/018,935 filed on Sep. 11, 2020, entitled "SYSTEMS AND METHODS FOR SELF CORRECTING SECURE COMPUTER SYSTEMS," which is a continuation-in-part of U.S. patent application Ser. No. 16/743,907 filed on Jan. 15, 2020, and issued as U.S. Pat. No. 11,048,578 on Jun. 29, 2021, which is a continuation of U.S. patent application Ser. No. 15/939,496 filed on Mar. 29, 2018, entitled "SYSTEMS AND METHODS FOR SELF CORRECTING SECURE COMPUTER SYSTEMS" and issued as U.S. Pat. No. 10,579,465 on Mar. 3, 2020, which are hereby incorporated by reference in its entirety.

BACKGROUND

The field of the invention relates generally to secure computer systems, and more specifically, to systems and methods for having computer systems securely load to prevent persistent attacks.

Currently, operating systems are executed from persistent memory, which increases vulnerability to persistent attacks. Verifying the integrity of an operating system stored in persistent memory may be resource intensive and time consuming. Specifically, persistent storage may have lengthy random access times compared to volatile memory. Tracking changes to an operating system configuration stored in persistent memory may be similarly resource intensive. Furthermore, securing keys through encryption is very important for systems that use keys. If the certain aspects of the encryption process are known, then in some situations reverse-engineering of the keys could be possible.

BRIEF DESCRIPTION

In one aspect, a self-correcting secure computer system is provided. The computer system includes a read-only memory (ROM) device, a random access memory (RAM) device, and at least one processor in communication with the ROM device and the RAM device. The at least one processor is programmed to receive an activation signal, retrieve, from the ROM device, data to execute an operating system, and execute, on the RAM device, the operating system based on the data from the ROM device.

In another aspect, a method of operating a self-correcting secure computer system is provided. The self-correcting computer system includes a read-only memory (ROM) device, a random access memory (RAM) device, and at least one processor in communication with the ROM device and the RAM device. The method includes receiving an activation signal, retrieving, from the ROM device, data to execute an operating system, and executing, on the RAM device, the operating system based on the data from the ROM device.

In a further aspect, a self-correcting secure computer system is provided. The computer system includes a read-only memory (ROM) device, a random access memory (RAM) device, and at least one processor in communication with the ROM device and the RAM device. The at least one processor is programmed to receive an activation signal; retrieve, from the ROM device, data to execute a first configuration including an encryption suite; execute, on the RAM device, the first configuration including the encryption suite; execute the encryption suite to generate a key; store the key at a first memory location; and delete volatile memory associated with the encryption suite.

In yet a further aspect, a method of operating a self-correcting secure computer system is provided. The self-correcting computer system includes a read-only memory (ROM) device, a random access memory (RAM) device, and at least one processor in communication with the ROM device and the RAM device. The method includes receiving an activation signal; retrieving, from the ROM device, data to execute a first configuration including an encryption suite; executing, on the RAM device, the first configuration including the encryption suite; executing the encryption suite to generate a key; storing the key at a first memory location; and deleting volatile memory associated with the encryption suite.

In still a further aspect, a self-correcting secure computer system is provided. The computer system includes a read-only memory (ROM) device, a random access memory (RAM) device, and at least one processor in communication with the ROM device and the RAM device. The at least one processor is programmed to execute a network connection; receive a request to access a key for at least one operation; deactivate the network connection; retrieve the key from a first location to volatile memory; perform the at least one operation with the key; delete the key from the volatile memory; and reactivate the network connection.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

DETAILED DESCRIPTION

Figure 1:
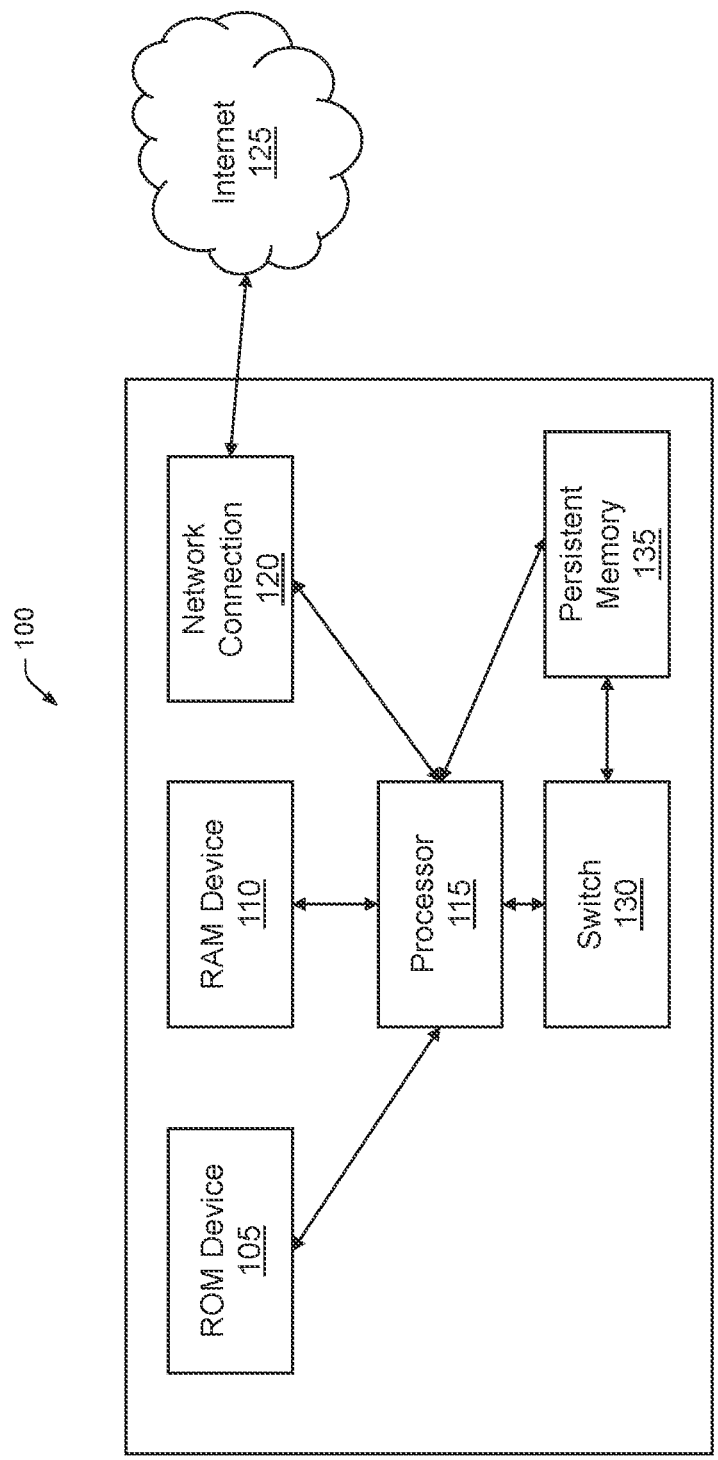
FIG. 1 illustrates a graphical view of an exemplary self-correcting secure computer system in accordance with one embodiment of the disclosure.

The described embodiments enable a self-correcting secure (SCS) computer system to reduce vulnerability to persistent attacks, such as, but not limited to, tojans, viruses, back-door access, keyloggers, and any other cyber-attack that may be performed remotely or via installed malware.

The SCS computer system is configured to load a trusted operating system configuration from a read-only memory into volatile memory during a boot process. In the exemplary embodiment, an operating system configuration is copied from a read-only memory ("ROM") having high sequential read times to a ram-disk stored in volatile random access memory ("RAM"). In this embodiment, the SCS computer system is configured to execute the operating system from the ram-disk. In other words, a clean operating system configuration is loaded from a high integrity storage device to a high performance storage device. The SCS computer system is configured to automatically load the trusted operating system configuration during the boot process, without the need for user intervention or monitoring, and with reduced processing time. Furthermore, the SCS computer system automatically erases the volatile memory thereby clearing all of the data on the RAM device, in response to a shutdown or power interruption.

In certain embodiments, the SCS computer system may selectively enable access to persistent storage, or a portion of the persistent storage. The SCS computer systems may allow write access to only a specific segment of persistent storage. For example, user documents may be saved to persistent storage. Any data not specifically saved to persistent storage will be deleted from the volatile memory when the SCS computer system is powered down, has a power interruption, and/or reboots. This prevents malicious applications from remaining on the SCS computer device and protects the trusted operating system configuration.

In further embodiments, the SCS computer system may allow access to one or more networks, such as the Internet. Prior to allowing access to persistent storage, the SCS computer system disconnects from the one or more networks and prevents reconnection to the one or more networks until after the SCS computer system reboots, which erases the volatile memory.

In still further embodiments, the SCS computer system may include one or more encryption programs or protocols. When a user requests access to the one or more encryption protocols, the SCS computer system first disconnects from the one or more networks. This ensures that information about the encryption is protected, such as encryption logs. While the user can still copy the encrypted files to a removable persistent memory storage device, such as a universal serial bus (USB) memory stick, outside monitoring software is preventing from reporting on the encryption process as all logs and data not specifically stored in the persistent memory will be erased when the SCS computer system shuts down or reboots. Since the network connections are shut down until the SCS computer system restarts, malicious applications and software are prevented from reporting information about the encryption process.

Many conventional electronic devices utilize a Public Key Infrastructure (PKI) to validate an electronic signature of the device in a variety of technology fields, such as telecommunications (e.g., mobile communication devices), the Internet of Things (IoT), online banking, secure email, and e-commerce. PKI uses a pair of cryptographic keys (e.g., one public and one private) to encrypt and decrypt data. PKI utilization enables, for example, devices to obtain and renew X.509 certificates, which are used to establish trust between devices and encrypt communications using such protocols as Transport Layer Security (TLS), etc. A PM includes policies and procedures for encrypting public keys, as well as the creation, management, distribution, usage, storage, and revocation of digital certificates. On the security infrastructure side, PKI-based authentication as been able to provide strong cryptographic techniques for establishing verifiable device identities, and also for managing these identities on an ongoing basis. However, the process of setting up a PKI requires detailed knowledge of cryptography and security methodologies, and can be quite costly to implement on an individual basis. Furthermore, the process needs to be secure from outside tampering or knowledge of exactly how the keys are encrypted.

The systems and methods disclosed herein, describe using a SCS computer system to generate private keys for a PKI system or a shared key for a symmetric key system. As used herein, the term 'private key' could refer to a private key for a asymmetric key system or a shared key for a symmetric key system. When generating a private key, a passphrase can be used as a starting seed for generating the key. Preventing outside knowledge of that passphrase or the order of encryption operations that are performed on that passphrase is highly important to the security of the key pair in the future. Therefore, the SCS computer system can be used to ensure that the passphrase and encryption methodology is protected.

In the exemplary embodiment, the SCS computer system is configured to 'forget' important details of the key generation process after the process has been completed. In some embodiments, this 'forgetting' step uses the reset capability of the SCS computer system to restart the SCS computer system and empty the memory of the SCS computer system. In other embodiments, the "forgetting" step/process includes, but is not limited to, flushing or deleting memory where sensitive information is stored, deleting links to or address information for portions of memory, rewriting over memory sections with all 1's and/or 0's, or any other methodology for causing the system to lose access to the information.

In at least one embodiment, the SCS computer system boots up into a configuration for generating private keys. The SCS computer system can load an encryption suite or other software stored in the ROM disk and/or persistent memory. In some embodiments, at least one of the ROM disk and/or the persistent memory is encrypted. In these embodiments, the SCS computer system launches the decrypter upon boot-up. The SCS computer system decrypts the image of the operating system and loads the decrptyed operating system into RAM. The SCS computer system can then use the decrypted operating system to generate keys. When the user requests to access the Internet, unencrypted persistent memory, or a different area of encrypted persistent memory, the SCS computer device can reboot, thus clearing the RAM disk and 'forgetting' the steps that the SCS computer device performed in generating keys.

To prevent the loss of the newly generated keys upon reboot, the SCS computer system can store the newly generated keys in a specific location in persistent memory. This location could be known to the encrypted operating system and other operating systems as a pass-through location, which allows for the safe storage of the keys during the reboot process, but would not be able to store other information, such as the passphrase that was used. Furthermore, this location may only be known as a specific address in persistent memory, where the hand off between operating systems can occur. The pass-through location can be limited to the size of a single key, or a specific number of keys, to prevent misuse.

FIG. 1 illustrates a graphical view of an exemplary self-correcting secure (SCS) computer system 100 in accordance with one embodiment of the disclosure.

In the exemplary embodiment, SCS computer system 100 includes a ROM device 105, a RAM device 110, and at least one processor 115.

The ROM device 105 includes read-only memory containing a trusted operating system configuration and associated applications. In the exemplary embodiment, the ROM device 105 has high sequential read times. The RAM device 110 includes volatile memory and is configured to execute the operating system and associated during a boot process. The RAM device 110 is also configured to erase everything in volatile memory thereby clearing all of the data on the RAM device 110, in response to a shutdown or power interruption.

In the exemplary embodiment, the trusted operating system configuration is stored on the ROM device 105. The processor 115 instructs the ROM device 105 to transmit the trusted operating system configuration to a ram-disk stored in the RAM device 110 during the boot process of SCS computer system 100. The RAM device 110 and the processor 115 are configured to execute the operating system from the ram-disk. Therefore, a clean operating system configuration is loaded from a high integrity storage device (ROM device 105) to a high-performance storage device (RAM device 110). The SCS computer system 100 is configured to automatically load the trusted operating system configuration during the boot process, without the need for user intervention or monitoring, and with reduced processing time.

For example, a user may activate the boot sequence of the SCS computer system 100. In some embodiments, the user may activate the boot sequence by pressing a start or on button of the SCS computer system 100. In other embodiments, the user may activate the boot sequence in response to receiving a reboot or restart signal. The SCS computer system 100 loads the operating system from the ROM device 105 into the RAM device 110. The processor 115 executes the operating system, and any associated applications, on the RAM device 110. In this example, the user may generate a document. When the SCS computer system 100 is powered down or rebooted, the document is automatically and permanently erased from the volatile memory.

In at least one further embodiment, the SCS computer system 100 includes one or more network connections 120. In some embodiments, the one or more network connections 120 connect to the Internet 125. In some other embodiments, the one or more network connections 120 connect to a network of other computer devices and/or other SCS computer systems 100. More specifically, SCS computer system 100 may communicatively coupled to the Internet 125 through many network connections 120 including, but not limited to, at least one of a network, such as a local area network (LAN), a wide area network (WAN), or an integrated services digital network (ISDN), a dial-up-connection, a digital subscriber line (DSL), a cellular phone connection, and a cable modem.

In some embodiments, the SCS computer system 100 also includes a switch 130 and persistent memory 135. In some embodiments, the switch 130 may include, but is not limited to, one of a physical switch attached to the computer system and a software switch selectable by a user. The persistent memory 135 may include, but is not limited to, an external hard drive, an internal hard drive, a universal serial bus (USB) memory device, and a hard drive partition. In some further embodiments, the persistent memory 135 is a USB memory device and the switch 130 is activated when the user inserts the USB memory device into a port on the SCS computer system 100. In these embodiments, SCS computer system 100 receives a signal from a USB port that a USB device with persistent memory is being connected. The signal acts as switch 130.

In some further embodiments, the SCS computer system 100 includes a processor, such as processor 115 (shown in FIG. 1), in communication with an internal hard drive. In these embodiments, the internal hard drive is partitioned into two or three partitions. In these embodiments, the first partition is configured to be the ROM device 105. This partition is preloaded with a trusted operating system configuration and is configured to be read-only. The second partition is configured to be the RAM device 110. This partition is configured to execute the operating system and is configured to be volatile memory. In some embodiments, a third partition is configured to be the persistent memory 135. In some further embodiments, a partitioned hard drive including at least two partitions can include at least one of the ROM device 105, the RAM device 115, and persistent memory 135.

In one embodiment, a plurality of SCS computer systems 100 are set-up in a cyber-café. When the user is finished with the SCS computer system 100, the system 100 reboots, all of the changes made by the user are deleted and a new copy of the operating system is loaded onto the system 100.

Figure 2:
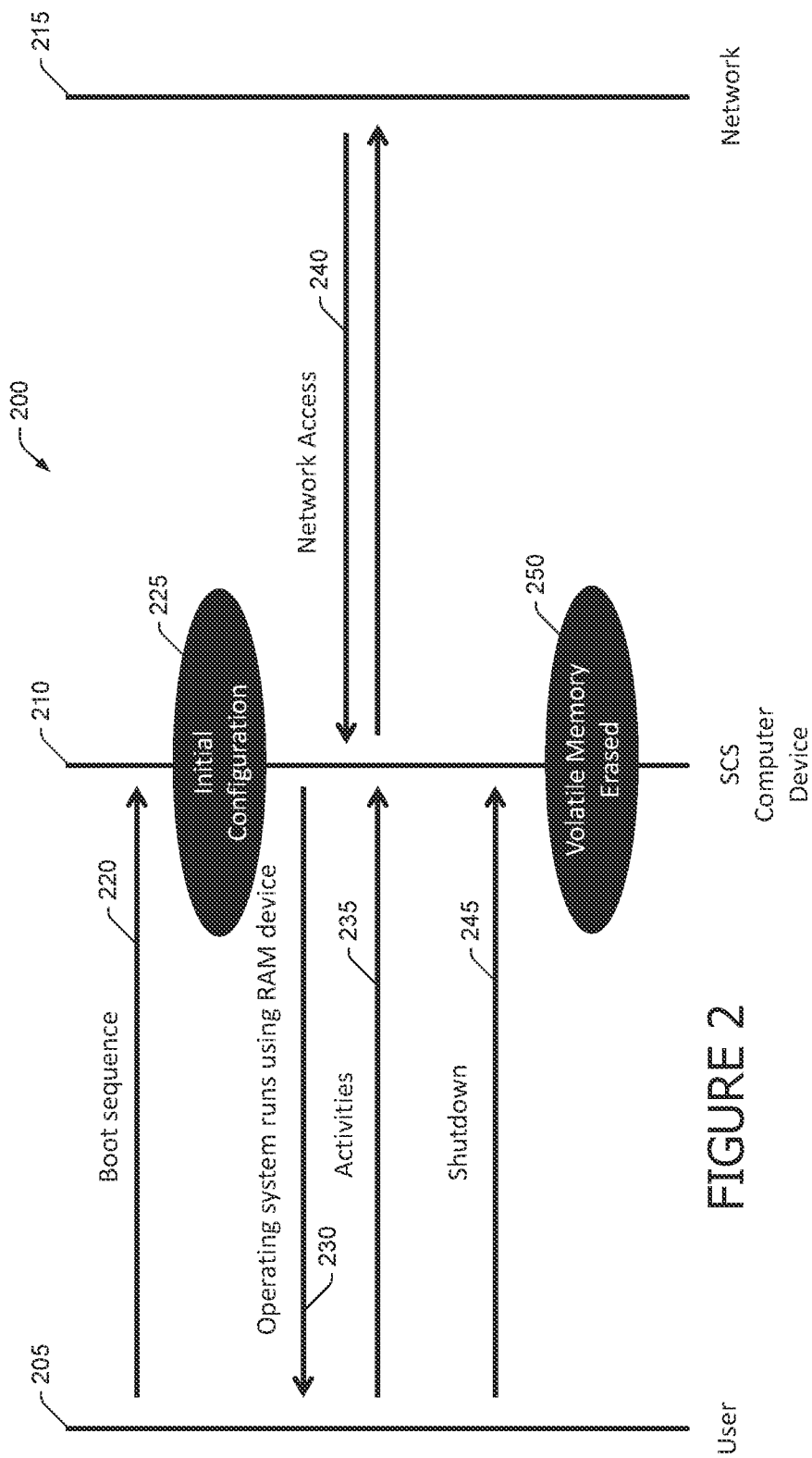
FIG. 2 illustrates a graphical view of the data flows of operating the self-correcting secure computer system shown in FIG. 1 in accordance with one embodiment of the disclosure.

FIG. 2 illustrates a graphical view 200 of the data flows of operating the self-correcting secure computer system 100 (shown in FIG. 1) in accordance with one embodiment of the disclosure.

In the exemplary embodiment, a user 205 is using an SCS computer device 210. The user 205 activates the boot sequence 220 of the SCS computer device 210. The SCS computer device 210 loads the initial configuration 225 of the trusted operating system. In the exemplary embodiments, the trusted operating system is stored on ROM device 105 (shown in FIG. 1) and the initial configuration is loaded onto RAM device 110 (shown in FIG. 1). The operating system runs 230 using the RAM device 110 and allows the user 205 to perform activities 235 on the SCS computer device 210. Examples of activities include, but are not limited to, word processing, playing video games, and network access 240. Network access 240 allows the user 205 to access a network 215, such as the Internet 125 (shown in FIG. 1).

When the SCS computer device 210 receives a shutdown 245 command from the user 205, the SCS computer device 210 erases 250 the volatile memory, such as the RAM device 110 as a part of the shutdown process.

Figure 3:
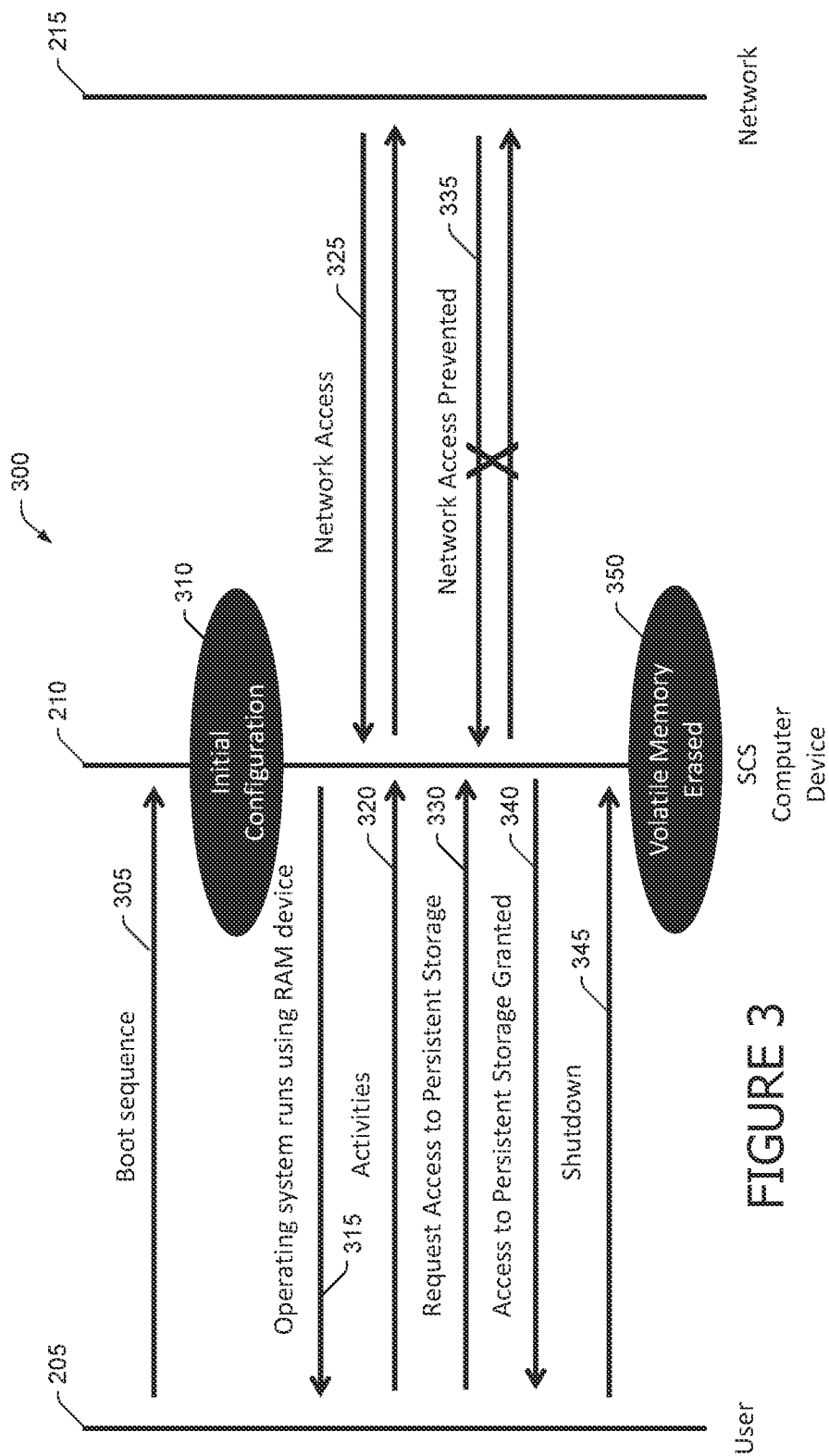
FIG. 3 illustrates a graphical view of the data flows of connecting the self-correcting secure computer system shown in FIG. 1 to a persistent memory in accordance with one embodiment of the disclosure.

FIG. 3 illustrates a graphical view 300 of the data flows of connecting the self-correcting secure computer system 100 (shown in FIG. 1) to a persistent memory 135 (shown in FIG. 1) in accordance with one embodiment of the disclosure.

In the exemplary embodiment, a user 205 is using an SCS computer device 210. The user 205 activates the boot sequence 305 of the SCS computer device 210. The SCS computer device 210 loads the initial configuration 310 of the trusted operating system. In the exemplary embodiments, the trusted operating system is stored on ROM device 105 (shown in FIG. 1) and the initial configuration is loaded onto RAM device 110 (shown in FIG. 1). The operating system runs 315 using the RAM device 110 and allows the user 205 to perform activities 320 on the SCS computer device 210. Examples of activities include, but are not limited to, word processing, playing video games, and network access 325. Network access 325 allows the user 205 to access a network 215, such as the Internet 125 (shown in FIG. 1).

The SCS computer device 210 receives a request for access 330 to persistent storage, such as persistent memory 135 (shown in FIG. 1). The SCS computer device 210 disables network access 335 and prevents any future access to the network 215. After disabling network access 335, the SCS computer device 210 grants 340 the user 205 access to the persistent memory 135.

When the SCS computer device 210 receives a shutdown 345 command from the user 205, the SCS computer device 210 erases 350 the volatile memory, such as the RAM device 110 as a part of the shutdown process.

Figure 4:
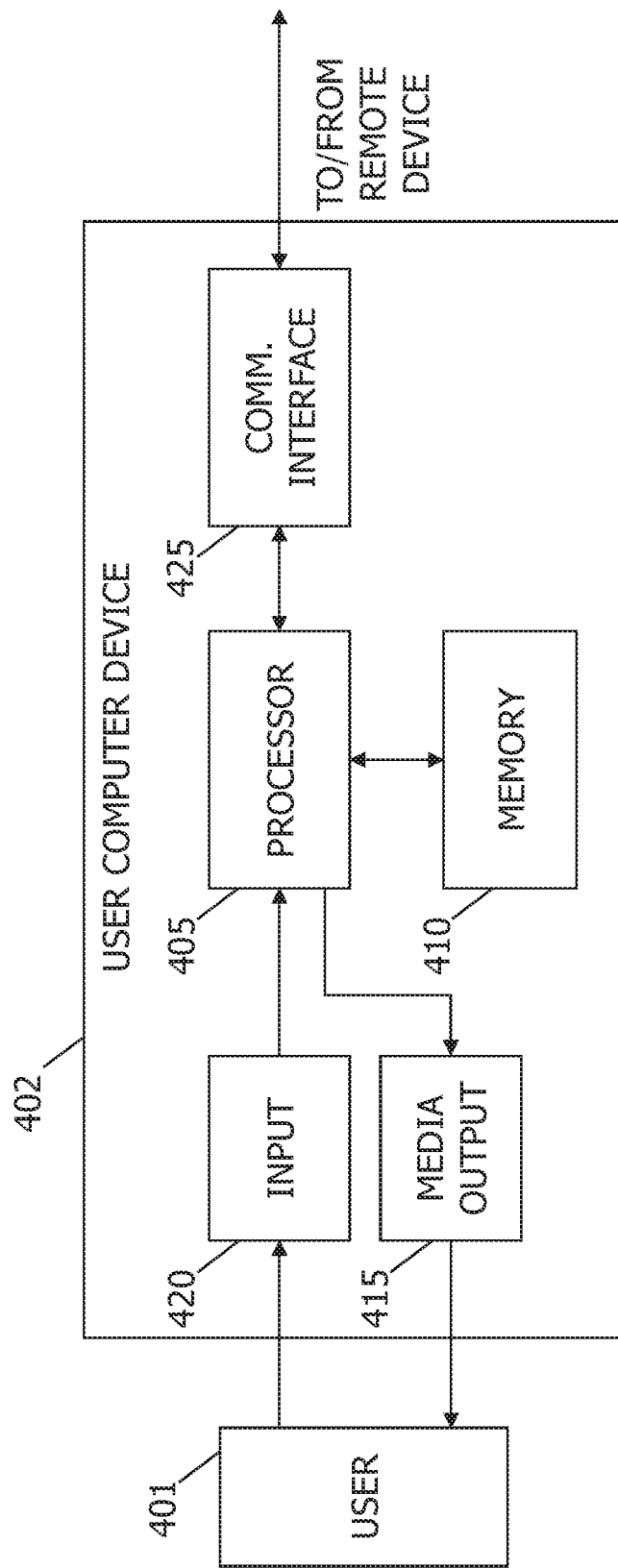
FIG. 4 illustrates an exemplary configuration of a client computer device as shown in FIG. 1, in accordance with one embodiment of the present disclosure.

FIG. 4 depicts an exemplary configuration of client computer device, in accordance with one embodiment of the present disclosure. User computer device 402 may be operated by a user 401. In some embodiments, user 401 is similar to user 205 shown in FIG. 1. User computer device 402 may include, but is not limited to, SCS computer system 100 (shown in FIG. 1) and SCS computer device 210 (shown in FIG. 2). User computer device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or transaction data to be stored and retrieved. Memory area 410 may include one or more computer readable media. In some embodiments, memory 410 includes one or more of ROM device 105, RAM device 110, and persistent memory 135 (all shown in FIG. 1)

User computer device 402 may also include at least one media output component 415 for presenting information to user 401. Media output component 415 may be any component capable of conveying information to user 401. In some embodiments, media output component 415 may include an output adapter (not shown) such as a video adapter and/or an audio adapter. An output adapter may be operatively coupled to processor 405 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 415 may be configured to present a graphical user interface (e.g., a web browser and/or a client application) to user 401. A graphical user interface may include, for example, an interface for browsing the Internet 125 (shown in FIG. 1). In some embodiments, user computer device 402 may include an input device 420 for receiving input from user 401. User 401 may use input device 420 to, without limitation, input requirements such as risk thresholds.

Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 415 and input device 420.

User computer device 402 may also include a communication interface 425, communicatively coupled to a remote device such as via network 215 (shown in FIG. 2). Communication interface 425 may include, for example, a wired or wireless network adapter and/or a wireless data transceiver for use with a mobile telecommunications network.

Stored in memory area 410 are, for example, computer readable instructions for providing a user interface to user 401 via media output component 415 and, optionally, receiving and processing input from input device 420. A user interface may include, among other possibilities, a web browser and/or a client application. Web browsers enable users, such as user 401, to display and interact with media and other information typically embedded on a web page or a website. A client application may allow user 401 to interact with, for example, Internet 125.

More specifically, user computer device 402 may be communicatively coupled to the Internet 125 through many interfaces including, but not limited to, at least one of a network, such as a local area network (LAN), a wide area network (WAN), or an integrated services digital network (ISDN), a dial-up-connection, a digital subscriber line (DSL), a cellular phone connection, and a cable modem. User computer device 402 may be any device capable of operating as described herein including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Figure 5:
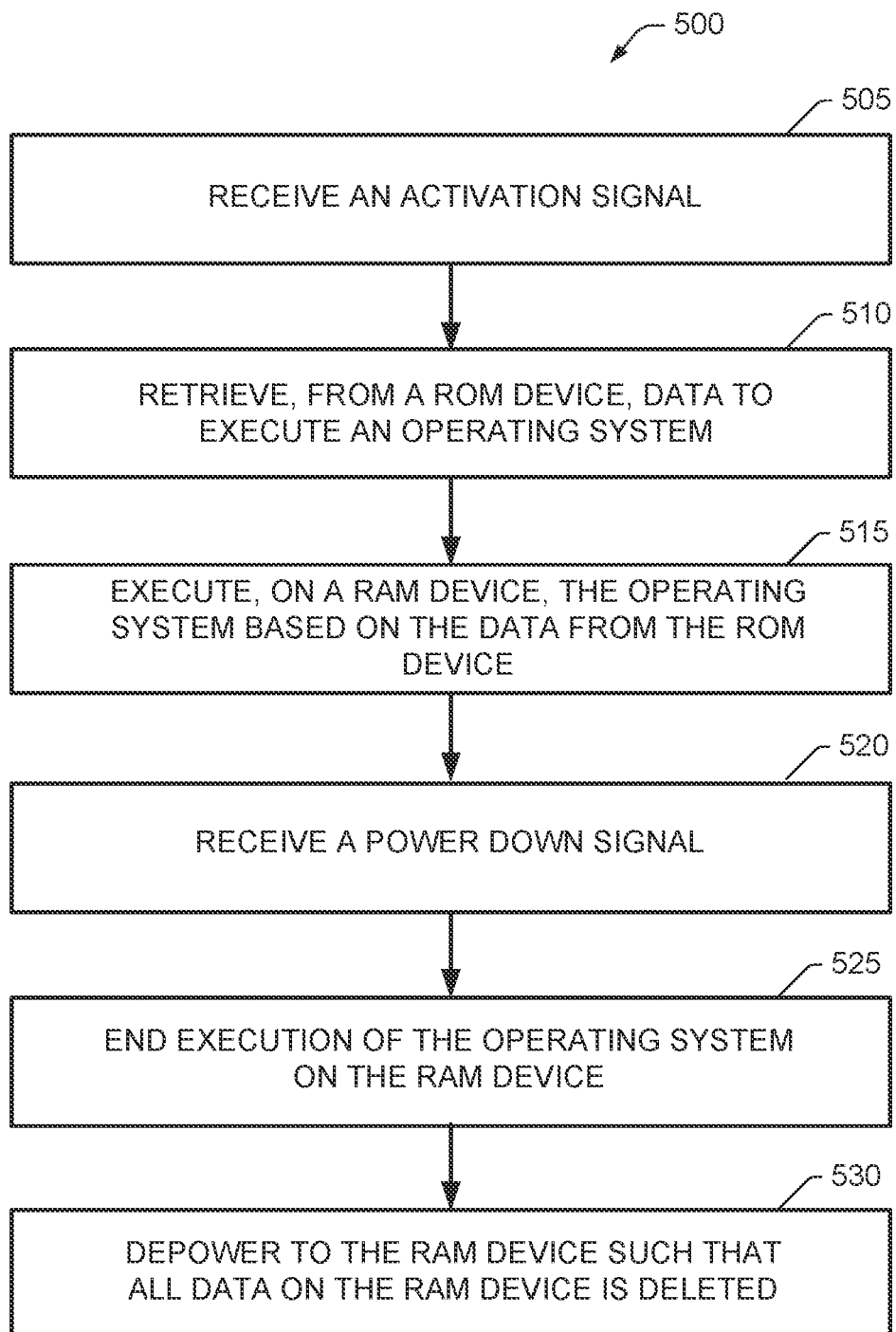
FIG. 5 illustrates a flow chart of a process for operating the self-correcting secure computer system shown in FIG. 1 in accordance with one embodiment of the disclosure.

FIG. 5 illustrates a flow chart of a process 500 for operating the self-correcting secure computer system shown in FIG. 1 in accordance with one embodiment of the disclosure. In the exemplary embodiment, process 500 is performed by SCS computer system 100 (shown in FIG. 1), SCS computer device 210 (shown in FIG. 2), and/or user computer device 402 (shown in FIG. 4).

In the exemplary embodiment, SCS computer system 100 receives 505 an activation signal. In some embodiments, the activation signal is received 505 from an activation switch or on/off button physically attached to the SCS computer system 100. In other embodiments, the activation signal is internal and received 505 in response to a restart or reboot command from the user 205 (shown in FIG. 2). The SCS computer system 100 initiates a boot sequence 220 (shown in FIG. 2). The SCS computer system 100 retrieves 510, from the ROM device 105 (shown in FIG. 1), data to execute an operating system and loads that data onto RAM device 110 (shown in FIG. 1). In the exemplary embodiment, the data is a trusted operating system configuration, such as initial configuration 225 (shown in FIG. 2). The SCS computer system 100 executes 515, on the RAM device 110, the operating system based on the data from the ROM device 105.

In some embodiments, the SCS computer system 100 receives 520 a power down signal. The SCS computer system 100 ends 525 execution of the operating system on the RAM device 110. Then the SCS computer system 100 depowers 530 the RAM device 110 such that all data on the RAM device 110 is deleted. In other embodiments, the SCS computer system 100 receives a reboot signal. The SCS computer system 100 clears all data from the RAM device 110. In some embodiments, the SCS computer system 100 interrupts power to the RAM device 110 to clear the volatile memory. In other embodiments, the SCS computer system 100 transmits a clear signal to the RAM device 110 and the RAM device 110 clears its volatile memory. Once the volatile memory of the RAM device 110 is cleared, the SCS computer system 100 retrieves 510, from the ROM device 105, data to execute the operating system and transmits that data to the RAM device 110. The SCS computer system 100 executes 515, on the RAM device 110, the operating system based on the data from the ROM device 105.

In some embodiments, the SCS computer system 100 includes one or more network connections 120 (shown in FIG. 1) to one or more networks and/or the Internet 125 (shown in FIG. 1). In some of these embodiments, the SCS computer system 100 protects the persistent memory 135 (shown in FIG. 1) from outside influences, such as by being accessed while connected to the Internet 125. In these embodiments, the SCS computer system 100 receives a signal from a first switch 130 (shown in FIG. 1) to access a persistent memory 135. The SCS computer system 100 deactivates the network connection 120. Upon confirmation of the deactivation of the network connection 120, the SCS computer system 100 initiates connection to the persistent memory 135. Examples of persistent memory 135 include, but are not limited to, an external hard drive, an internal hard drive, a universal serial bus memory device, and a hard drive partition. Examples of a switch 130 include, but are not limited to, a physical switch attached to the computer system and a software switch selectable by a user.

In some further embodiments, the SCS computer system 100 receives a signal from a USB port that a USB device with persistent memory 135 is being connected to the SCS computer system 100. In these embodiments, the USB port acts as the switch 130 and the act of plugging the device into the USB port triggers the switch 130. The SCS computer system 100 deactivates the network connections 120. Upon confirmation of the deactivation of the network connections 120, the SCS computer system 100 initiates connection to the USB device.

In some further embodiments, the SCS computer system 100 receives a request from a user to access an encryption suite associated with the SCS computer system 100. The SCS computer system 100 deactivates the network connections 120. Upon confirmation of the deactivation of the network connections, the SCS computer system 100 initiates the encryption suite.

In the above embodiments, the SCS computer system 100 is configured to prevent reactivation of the network connections 120 after the network connections 120 have been deactivated. To be able to use the network connections 120 after deactivation, the user will have to reboot or restart the SCS computer system 100. This erases everything in volatile memory and reloads a new, clean copy of the operating system into the RAM device 110.

In some further embodiments, the SCS computer system 100 receives a switch signal from the user while accessing the Internet 125 via the network connections 120. Based on this signal, the SCS computer system 100 deactivates the network connections 120. Then the SCS computer system 100 adjusts one or more network settings associated with the network connections 120, such as device name and a media access control address. The SCS computer system 100 reactivates the network connections 120 using the one or more adjusted network settings. By changing the network settings and reconnecting to the network, the SCS computer system 100 prevents tracking from cookies and other tracking applications that are monitoring the SCS computer system 100. These tracking applications are configured for the original network settings, and are not able to track the new network settings. Eventually, new cookies and other tracking applications will be loaded on to SCS computer system 100 through the network connections 120. The user may then again trigger the switch signal to reset the network settings and render these additional tracking applications moot.

Figure 6:
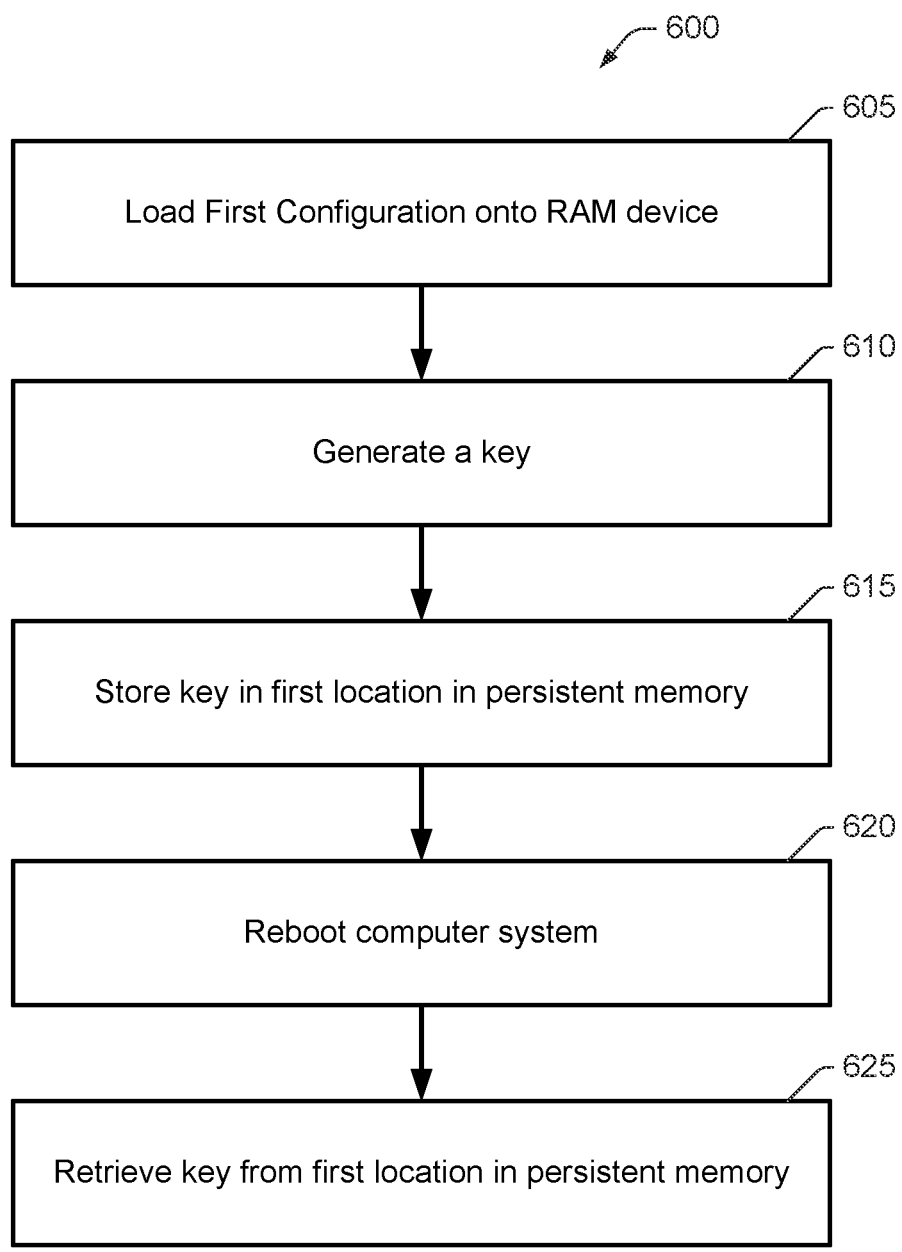
FIG. 6 illustrates a flow chart of a process for securely generating keys using the self-correcting secure computer system shown in FIG. 1.

FIG. 6 illustrates a flow chart of a process 600 for securely generating keys using the self-correcting secure computer system 100 (shown in FIG. 1). In the exemplary embodiment, ROM device 105 (shown in FIG. 1) stores a plurality of device configurations. These device configurations can include specific operating systems and other settings to set-up the SCS computer system 100 in different configurations to perform different operations with different security settings or security modes.

In these embodiments, the SCS computer system 100 could be an authentication server, a client device, or even a stand-alone computer device for private key use and/or generation.

Process 600 illustrates a second methodology for key generation in a controlled and potentially offline environment, where the key is then encrypted and stored in a persistent memory.

In the exemplary embodiment, the processor 115 (shown in FIG. 1) of the SCS computer device 100 loads 605 a first configuration onto the RAM device 110 (shown in FIG. 1). The first configuration provides access to one or more encryption suites or other programs that allows the system 100 to work as described herein. The SCS computer device 100 generates 610 a key. The key can be a private key or other key where the process of generation 610 needs to be private. The SCS computer device 100 can receive a passphrase or other input to use as a seed to generate 610 the key. The user can also determine an order of operations for encrypting the key, such as an order of encryption methods used to generate 610 the key.

In the exemplary embodiment, the SCS computer system 100 stores 615 the key in a first memory location in persistent memory 135 (shown in FIG. 1). In the exemplary embodiment, a section of persistent memory 135 is set aside for pass-through information, such as encryption keys. In the exemplary embodiment, the section of persistent memory 135 is an isolated area of memory, such as a hidden partition. In some embodiments, the section of persistent memory 135 is set aside to only be accessible when directly accessed, such as when the system 100 knows the exact address of the section of persistent memory 135. This section of persistent memory 135 can be specifically sized to only be able to accept a limited number of keys.

The SCS computer system 100 reboots 620, or otherwise resets. In some embodiments, the SCS computer system 100 can clear portions of the RAM device 110 to 'forget' specific details, such as the passphrase used to generate 610 the key or the order of operations taken to generate 610 the key. The SCS computer system 100 then retrieves 625 the key from the first memory location in persistent memory 135. In some embodiments, the SCS computer system 100 reboots 620 the computer system into a second configuration. The second configuration may know the first memory location in the persistent memory 135 to retrieve the one or more keys stored there, but does not know additional information about the process 600 that was used to generate 610 the one or more keys.

In some embodiments, the first memory location is on a hidden storage device or hidden partition, such as on persistent storage 135. The hidden location might not be accessible or visible by normal means, but instead may only be accessed by accessing the direct address on the persistent storage 135 or other memory device. The first memory location could be a hardware security module, such as, but not limited to, a common access card (CAC) or other smart card. The first memory location could also be a removable persistent memory device, such as a thumb drive or USB memory device. The first memory location could also be on a separate stand-alone device, where the device includes volatile memory, but no network connection. The key could then be stored on an encrypted and/or hidden partition or storage. The first memory location could also be an external security module, which could be a separate using that protects private keys and implements encryption and decryption.

In some embodiments, one or more of the plurality of device configurations are stored in an encrypted format or encrypted section of the ROM device 105 or persistent memory 135, where the device configuration needs to be decrypted prior to being loaded into the RAM device 110 (shown in FIG. 1). In some embodiments, the processor 115 (shown in FIG. 1) downloads an initial configuration from the ROM device 105 or the persistent memory 135 and onto the RAM device 110. The initial configuration includes at least one of an address for the encrypted configuration stored on the ROM device 105 and the decryption key for the encrypted configuration. In some embodiments, the address itself is store in an encrypted state and the system 100 decrypts the address to access the associated portion of memory. The initial configuration then decyrpts and loads the encrypted configuration onto the RAM device 110 to allow the processor to execute the encrypted configuration. In these embodiments, the encrypted configuration includes instructions and encryption information for generating private keys. In some further embodiments, the device configuration is stored on a hidden partition, such as on the ROM disk 105 or persistent memory 135, where the hidden partition is accessible by the system receiving the starting address or other address of the hidden partition. The system 100 could receive the address directly from a user or encrypted from a hardware security device or from an encrypted file.

In some embodiments, the keys generated could be shared by one or more procedures depending on the security requirements and capabilities of the system. One method would be through port hopping. The SCS computer system 100 implements a secure shell (SSH) connection, virtual private network (VPN), other secure tunnel, or uses used datagram protocol (UDP). The SCS computer system 100 executes an initial login. Then the SCS computer system 100 hops ports. The port hopping could be performed based on a pre-set pattern or an algorithm. The port hopping could also be performed by using HOP stations, IPs, and proxies, where the user can remotely wake-up or connect to remote stations. In some embodiments, there is no additional login or authentication performed on the hop. In some embodiments, the CSC computer system 100 transmits known encrypted values or transmits hashed authorization codes with every message to confirm the integrity and authenticity of the messages.

Another method for transmitting keys would be to transmit encrypted files via other file sharing protocols, such as, but not limited to, email, ftp, telnet, or other file sharing protocols. A further method is to share the keys manually using persistent storage, such as through mobile memory devices, aka thumb drives or known locations in persistent memory 135.

In a further method, the SCS computer system 100 remote boots another RAM system and logs into the remote RAM system. This connection and remote instructions may be performed over a VPN or other secure connection to the remote RAM system.

In an additional method, the keys may be disseminated through an Authentication Server. In this method, the SCS computer system 100 sends a message or logs into the Authentication Server via an encrypted tunnel or other method for key distribution via server.

As described herein, the key can be securely stored in an encrypted format. In one embodiment, the user can use a password to decrypt the persistent memory 135. The password can include, but is not limited to, biometrics, dongles (attached hardware devices), and/or type passwords or pins. Then a second password or pin can be used to decrypt and/or use the private key itself. In some embodiments, only one password may be used to decrypt the key.

In some embodiments, remote login is used for confirming trust the key or for distributing the key to require public and/or private key login with an authentication server or other private key storage. This can be performed using steps, such as, but not limited to, decrypt, load operating system, execute vpn login, and connect to remote machine.

In a lower security private key access method, the public/private keys are all run on volatile memory. The private keys are stored in an encrypted partition or storage. The system decrypts the keys for usage. The system reboots 620 periodically to clean the system.

In a moderate security private key access method, the public/private keys are all run on volatile memory. Any network connection is stopped when the system accesses a private key. The system reboots 620 periodically to clean the system. In some embodiments, the user presses a button (virtual or physical) when persistent memory 135 is inserted into the CSC computer system 100 to access the persistent memory 135 or to start the process to access the persistent memory 135. In these embodiments, the system 100 might not automatically access the persistent memory 135 when inserted until specifically instructed to. In other embodiments, a program requests access to a private key. The network connection is stopped. The storage partition or device with the private key is accessed. The private key is decrypted and then used, such as to sign a message or read a message. The decrypted private key is removed from the system, such as by deleting the decrypted private key. And the network connection is restored.

In another embodiment, when persistent memory 135 is inserted into the CSC computer system 100, the network connection is stopped. The CSC system 100 accesses a storage partition or other device that contains the private key. The private key is decrypted and then used, such as to sign a message or to read a message. The decrypted private key is deleted. When the persistent memory 135 is removed, the network connection is restored.

In a further embodiment, the user presses a button (virtual or physical) and persistent memory is inserted or accessed or private key access is requested by the user or a program on the system. The network connection is then dropped. The CSC system 100 accesses a storage partition or other device that contains the private key. The private key is decrypted and then used, such as to sign a message or to read a message. Information is then encrypted and/or written to persistent memory 135 as needed. The CSC system 100 is rebooted 620. After the reboot is complete, the network connection is restored.

In a high security private key access method, each user and the authentication server have a stand-alone system for handling private keys that runs on volatile memory. This stand-alone system could be a part of a stand-alone network that does not allow access to other networks. Users and servers that connection to the Internet are not always running on volatile memory. A persistent memory 135 with encrypted contents is inserted into the stand-alone system. Or an encrypted partition is accessed. The stand-alone system decrypts the private key. In some embodiments, the private key remains decrypted for a period of time. The stand-alone system uses the private key. After a specific period of time, the stand-alone system deletes the decrypted private key. The persistent memory 135 is removed. The stand-alone system reboots 620 periodically for security.

After key generation 610, the CSC computer system 100 can be configured to 'forget' one or more of the following information to preserve security: a) the steps used to make the key; b) the steps used to generate the passphrase; c) any plaintext version of the passphrase; d) encryption and decryption steps and types used in generating the key; e) locations of encryption programs used; f) locations of encrypted files; and/or) locations of persistent storage 135. In some embodiments, the CSC computer system 100 is programmed to 'forget' or delete these locations and information when the CSC computer system 100 connects to the Internet. In some embodiments, the CSC computer system 100 can store the location information (and any other sensitive information) in a specific location, such as on the RAM device 110. The CSC computer system 100 can then delete that location, the information at that location, and/or delete the link to that location before the CSC computer system 100 accesses the Internet. In some embodiments, the encryption and decryption steps and types used in generating the key are deleted or forgotten after every encryption and/or decryption is performed.

In some embodiments, the CSC computer system 100 is locked from accessing persistent memory 135 while the encryption suite is in use. When the encryption suite is finished generating 610 the key(s), the encryption suite is deleted from the RAM device 110 before the CSC computer system 100 can access the persistent memory 135 to store the newly generated key. The CSC computer system 100 can also lock assess to portions of the RAM device 110 and/or the ROM device 105 while the encryption suite is in use.

In other embodiments, the CSC computer system 100 is locked from transferring certain types or locations of files to persistent memory 135 while the encryption suite is in use. This allows the CSC computer system 100 to store the newly generated encryption key to persistent memory 135, but not other information, like the passphrase. This access could be released with the CSC computer system 100 reboots 620.

In further embodiments, persistent storage 135 includes encrypted and non-encrypted storage. The persistent storage 135 can also include sections or partitions that are encrypted using different encryption methods. In these embodiments, when the encryption suite is being used, then only specifically encrypted portions of the persistent storage 135 can be used. For example, while the encryption suite is active, only encrypted storage A can be accessed. While the CSC computer system 100 is connected to the Internet, then only unencrypted storage can accessed. While the CSC computer system 100 has no network connections, and the encryption suite is not active, then only encrypted storage B can be accessed. In these embodiments, the encryption key could be stored in a section of encrypted storage that would be accessible while encrypted storage A or encrypted storage B are available. Furthermore, the key could be stored in a hidden partition that in only accessible by direct addressing.

Figure 7:
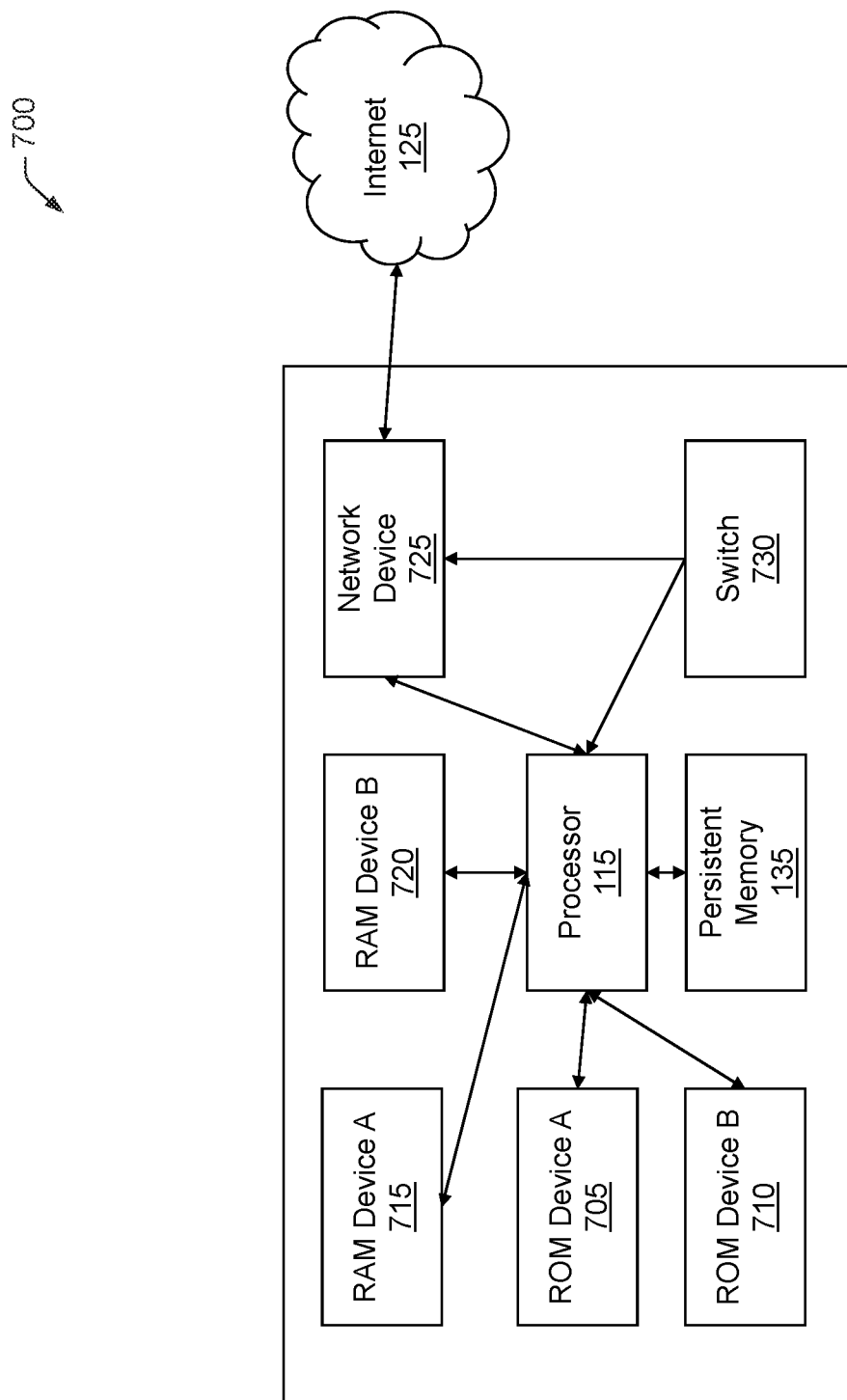
FIG. 7 illustrates a graphical view of another self-correcting secure computer system in accordance with one embodiment of the disclosure.

FIG. 7 illustrates a graphical view of another self-correcting secure computer system 700 in accordance with one embodiment of the disclosure.

System 700 includes ROM device A 705 and ROM device B 710. ROM device A 705 is separate memory from ROM device B 710. In some embodiments, ROM devices A and B 705 and 710 are separate physically. In other embodiments, ROM devices A and B 705 and 710 are separate partitions of memory on ROM device 105 (shown in FIG. 1). In some embodiments, ROM devices A and B 705 and 710 are encrypted. In some further embodiments, ROM device A 705 is encrypted with a different encryption method or key than ROM device B 710.

System 700 also includes RAM device A 715 and RAM device B 720. RAM device A 715 is separate memory from RAM device B 720. In some embodiments, RAM devices A and B 715 and 720 are separate physically. In other embodiments, RAM devices A and B 715 and 720 are separate partitions of memory on RAM device 110 (shown in FIG. 1). In some embodiments, RAM devices A and B 715 and 720 are encrypted. In some further embodiments, RAM device A 715 is encrypted with a different encryption method or key than RAM device B 720. In the exemplary embodiment, RAM device A 715 and RAM device B 720 are emptied or flushed separately. For example, when the system 700 reboots, RAM device A 715 may lose power and have all of its contents deleted, while RAM device B 720 continues to be powered and maintains its contents.

Furthermore, in some embodiments, the contents of RAM device A 715 and RAM device B 720 can be deleted separately. For example, an operating system in a first configuration could be loaded and executed on RAM device A 715. An encryption suite could be loaded and executed on RAM device B 720. When the encryption suite is finished, RAM device B 720 could be depowered or otherwise deleted, to remove the data about how encryption suite was used. In some embodiments, one or more of RAM device A and B 715 and 720 can be deleted based on a signal from a program or on a signal from a switch 730. The switch can be a hardware switch or a software switch. For the hardware switch 130, the hardware switch 130 can be connected to the processor 155, which then sends a signal to flush the corresponding memory. In some embodiments, the hardware switch 130 is directly connected to RAM device A 715 or RAM device B 720. When the hardware switch 130 is activated, the contents of corresponding RAM device A 715 or B 720 are deleted, such as by depowering the corresponding RAM device A and B 715 and 720 or by writing all ones and then all zeroes to the device.

In some other embodiments, switch 130 is configured to disconnect the network device 725. In these embodiments, system 700 is in communication with the Internet 125. When the user presses the switch 730 (either hardware or software switch 130), the network device 725 is disconnected. In some software situations, a user may press a button on a system 100 to disable a network connection 120 (shown in FIG. 1); however, a piece of malware pretends that the network connection 120 is disconnected, but is actually still connected. Switch 730 causes a physical disconnect on the network device 725 to prevent external communication. In some embodiment, switch 730 is a hardware switch with a direct connection to the network device 725 that bypasses the processor 115 and allows the switch 730 to directly disconnect the network device 725.

At least one of the technical solutions to the technical problems provided by this system may include: (i) a secured computer system with a trusted operating system; (ii) automatically deleting cookies and/or malware; (iii) preventing malware from persistently infecting the computer system; (iv) protecting persistent memory from potential remote cyber-attacks; and (v) anonymizing web browsing.

The methods and systems described herein may be implemented using computer programming or engineering techniques including computer software, firmware, hardware, or any combination or subset thereof, wherein the technical effects may be achieved by performing at least one of the following steps: (a) receive an activation signal, (b) retrieve, from a ROM device, data to execute an operating system, (c) execute, on a RAM device, the operating system based on the data from the ROM device, (d) receive a power down signal, (e) end execution of the operating system on the RAM device, (f) depower the RAM device such that all data on the RAM device is deleted, (g) receive a signal from a first switch to access a persistent memory, wherein the persistent memory is one of an external hard drive, an internal hard drive, a universal serial bus memory device, and a hard drive partition, wherein the first switch is one of a physical switch attached to the computer system and a software switch selectable by a user, (h) deactivate the network connection, (i) upon confirmation of the deactivation of the network connection, initiate connection to the persistent memory, (j) receive a signal from a USB port that a USB device with persistent memory is being connected, (k) deactivate the network connection, (l) upon confirmation of the deactivation of the network connection, initiate connection to the USB device, (m) receive a request from a user to access an encryption suite, (n) deactivate the network connection, (o) upon confirmation of the deactivation of the network connection, initiate the encryption suite, (p) prevent reactivation of the network connection after the network connection had been deactivated, (q) receive a switch signal from the user while accessing the Internet via the network connection, (r) deactivate the network connection; (s) adjust one or more network settings, wherein the one or more network settings include a device name and a media access control address, and (t) reactivate the network connection using the one or more adjusted network settings.

The technical effects described herein may also be achieved by performing at least one of the following steps: a) receive an activation signal; b) retrieve, from the ROM device, data to execute a first configuration including an encryption suite; c) execute, on the RAM device, the first configuration including the encryption suite; d) execute the encryption suite to generate a key; e) store the key at a first memory location, wherein the first memory location is in a persistent memory, wherein the first configuration prevents access to the persistent memory other than at the first memory location; f) delete volatile memory associated with the encryption suite; g) delete the volatile memory associated with encryption suite by rebooting the computer system; h) delete one or more links to portion of the RAM device associated with the encryption suite, wherein a portion of the RAM device is configured for executing the encryption suite; i) execute, on the RAM device, a second configuration without an encryption suite; j) retrieve, from the first memory location, the key while executing the second configuration; k) execute a network connection; l) receive a request to access the key for at least one operation; m) deactivate the network connection; n) retrieve the key from the first location to volatile memory; o) perform the at least one operation with the key; p) delete the key from the volatile memory; q) reactivate the network connection after deleting the key; r) encrypt the key prior to storing in the first memory location using a first encryption method; s) retrieve the key from the first location to volatile memory; t) decrypt the key; u) perform at least one operation with the decrypted key; v) delete the decrypted key from the volatile memory.

In some further embodiments, the technical effects described herein may also be achieved by performing at least one of the following steps: a) retrieve, from the ROM device, data to execute an initial configuration; b) execute, on the RAM device, the initial configuration; c) receive an activation signal for an encryption suite; d) retrieve, from the ROM device, data to execute the first configuration including the encryption suite in response to the activation signal, wherein the first configuration is stored in an encrypted portion of the ROM device; e) retrieve, from the ROM device, the encrypted first configuration; f) decrypt the first configuration; g) execute the decrypted first configuration; h) receive the activation signal from a remote computer device through a secure connection; and i) provide access to the key through the secure connection.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured or unstructured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In another embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A self-correcting secure computer system comprising:
a read-only memory (ROM) device;
a random access memory (RAM) device; and
at least one processor in communication with the ROM device and the RAM device, the at least one processor programmed to:
receive an activation signal;
retrieve, from the ROM device, data to execute a first configuration;
execute, on the RAM device, the first configuration;
store a key at a first memory location;
execute a network connection;
receive a request to access the key for at least one operation;
deactivate the network connection;
retrieve the key from the first memory location to volatile memory;
perform the at least one operation with the key;
delete the key from the volatile memory; and
reactivate the network connection after deleting the key.

2. The computer system in accordance with claim 1, wherein the first configuration includes an encryption suite, and wherein the at least one processor is further programmed to:
execute, on the RAM device, the first configuration including the encryption suite; and
execute the encryption suite to generate the key.

3. The computer system in accordance with claim 2, wherein the at least one processor is further programmed to delete volatile memory associated with the encryption suite subsequent to storing the key.

4. The computer system in accordance with claim 2, wherein a portion of the RAM device is configured for executing the encryption suite and wherein the at least one processor is further programmed to delete one or more links to the portion of the RAM device associated with the encryption suite.

5. The computer system in accordance with claim 1, wherein the first memory location is in a persistent memory.

6. The computer system in accordance with claim 5, wherein the first configuration prevents access to the persistent memory other than at the first memory location.

7. The computer system in accordance with claim 1, wherein a plurality of memory key locations in a persistent memory store keys, and wherein the first configuration prevents access to the persistent memory other than the plurality of memory key locations.

8. The computer system in accordance with claim 1, wherein the at least one processor is further programmed to:
execute, on the RAM device, a second configuration without an encryption suite; and
retrieve, from the first memory location, the key while executing the second configuration.

9. The computer system in accordance with claim 1, wherein the at least one processor is further programmed to:
receive a signal from a hardware button; and
deactivate the network connection in response to the signal from the hardware button.

10. The computer system in accordance with claim 1, wherein the at least one processor is further programmed to encrypt the key prior to storing in the first memory location using a first encryption method.

11. The computer system in accordance with claim 10, wherein the at least one processor is further programmed to:
retrieve the key from the first memory location to volatile memory;
decrypt the key;
perform at least one operation with the decrypted key; and
delete the decrypted key from the volatile memory.

12. The computer system in accordance with claim 1, wherein the at least one processor is further programmed to:
retrieve, from the ROM device, data to execute an initial configuration;
execute, on the RAM device, the initial configuration;
receive an activation signal for an encryption suite; and
retrieve, from the ROM device, data to execute the first configuration including the encryption suite in response to the activation signal.

13. The computer system in accordance with claim 12, wherein the first configuration is stored in an encrypted portion of the ROM device, and wherein the at least one processor is further programmed to:
retrieve, from the ROM device, the encrypted first configuration;
decrypt the first configuration; and
execute the decrypted first configuration.

14. The computer system in accordance with claim 1, wherein the at least one processor is further programmed to:
receive the activation signal from a remote computer device through a secure connection; and
provide access to the key through the secure connection.

15. A method of operating a self-correcting secure computer system comprising a read-only memory (ROM) device, a random access memory (RAM) device, and at least one processor in communication with the ROM device and the RAM device, the method comprising:
receiving an activation signal;
retrieving, from the ROM device, data to execute a first configuration;
executing, on the RAM device, the first configuration;
storing a key at a first memory location;
executing a network connection;
receiving a request to access the key for at least one operation;
deactivating the network connection;
retrieving the key from the first memory location to volatile memory;
performing the at least one operation with the key;
deleting the key from the volatile memory; and
reactivating the network connection after deleting the key.

16. The method in accordance with claim 15, wherein the first configuration includes an encryption suite, and wherein the method further comprises:
executing, on the RAM device, the first configuration including the encryption suite; and
executing the encryption suite to generate the key.

17. The method in accordance with claim 15, wherein the first memory location is in a persistent memory, and where the method further comprises preventing access to the persistent memory other than at the first memory location.

18. The method in accordance with claim 15, wherein a plurality of memory key locations in a persistent memory store keys, and wherein the first configuration prevents access to the persistent memory other than the plurality of memory key locations.

19. The method in accordance with claim 15 further comprising:
encrypting the key prior to storing in the first memory location using a first encryption method;
retrieving the key from the first memory location to volatile memory;
decrypting the key;
performing at least one operation with the decrypted key; and
deleting the decrypted key from the volatile memory.

20. The method in accordance with claim 15, wherein the first configuration is stored in an encrypted portion of the ROM device, and wherein the method further comprises:
retrieving, from the ROM device, the encrypted first configuration;
decrypting the first configuration; and
executing the decrypted first configuration.

* * * * *